US011172679B2

(12) United States Patent
Qin et al.

(10) Patent No.: US 11,172,679 B2
(45) Date of Patent: Nov. 16, 2021

(54) CONTROLLING SPRAY DRIFT OF PESTICIDES WITH SELF-EMULSIFIABLE ESTERS

(71) Applicant: Corteva Agriscience LLC, Indianapolis, IN (US)

(72) Inventors: Kuide Qin, Chapel Hill, NC (US); Holger Tank, Indianapolis, IN (US); Stephen L. Wilson, Zionsville, IN (US); Lei Liu, Carmel, IN (US); David G. Ouse, Indianapolis, IN (US); Mei Li, Westfield, IN (US)

(73) Assignee: Corteva Agriscience LLC, Indianapolis, IN (US)

( * ) Notice: Subject to any disclaimer, the term of this patent is extended or adjusted under 35 U.S.C. 154(b) by 0 days.

(21) Appl. No.: 15/177,410

(22) Filed: Jun. 9, 2016

(65) Prior Publication Data

US 2016/0278370 A1 Sep. 29, 2016

Related U.S. Application Data

(63) Continuation of application No. 12/609,404, filed on Oct. 30, 2009, now abandoned.

(60) Provisional application No. 61/110,060, filed on Oct. 31, 2008.

(51) Int. Cl.

| | |
|---|---|
| ***A01N 25/30*** | (2006.01) |
| ***A01N 37/40*** | (2006.01) |
| ***A01N 39/04*** | (2006.01) |
| ***A01N 43/40*** | (2006.01) |
| ***A01N 57/20*** | (2006.01) |
| ***A01N 25/24*** | (2006.01) |
| ***A01N 37/38*** | (2006.01) |

(52) U.S. Cl.

CPC ............. *A01N 25/24* (2013.01); *A01N 25/30* (2013.01); *A01N 37/38* (2013.01); *A01N 37/40* (2013.01); *A01N 39/04* (2013.01); *A01N 43/40* (2013.01); *A01N 57/20* (2013.01)

(58) Field of Classification Search

None

See application file for complete search history.

(56) References Cited

U.S. PATENT DOCUMENTS

| | | | | |
|---|---|---|---|---|
| 3,912,642 | A | 10/1975 | Sturwold et al. | |
| 4,559,226 | A | 12/1985 | Fogel et al. | |
| 5,219,479 | A | 6/1993 | Mathiesen et al. | |
| 5,688,750 | A | 11/1997 | Cooban et al. | |
| 5,707,945 | A | 1/1998 | Cooban et al. | |
| 6,060,438 | A | 5/2000 | Oleksiak | |
| 6,103,770 | A * | 8/2000 | Trouve | A01N 25/02 514/785 |
| 6,214,771 | B1 | 4/2001 | Dexter | |
| 6,566,308 | B1 * | 5/2003 | Aven | A01N 25/02 504/347 |
| 6,797,673 | B1 * | 9/2004 | Worthley | A01N 25/30 504/118 |

FOREIGN PATENT DOCUMENTS

| | | | |
|---|---|---|---|
| GB | 2306965 | | 5/1997 |
| JP | 2002114601 | A * | 4/2002 |
| JP | 2005022984 | A * | 1/2005 |
| WO | 1990/005714 | | 5/1990 |
| WO | 1996/022109 | | 7/1996 |
| WO | 2005/071050 | | 8/2005 |
| WO | 2008/079304 | | 7/2008 |
| WO | 2008/101818 | | 8/2008 |

OTHER PUBLICATIONS

Cox, C. Clopyralid fact sheet; http://www.eastbaypesticidealert.org/Clopyralid.htm, 1998, no pagination.*

Priolube 3955 MSDS (downloaded from https://msds.crodadirect.com/ on Feb. 10, 2016).*

Pringnitz, B. A.; et al. "Selecting the correct Nozzle to reduce spray drift" Agriculture and Environment Extension Publications, 184. Iowa State University, 2001 p. 1-4. https://lib.dr.iastate.edu/cgi/viewcontent.cgi?referer=https://www.google.com/&httpsredir=1&article=1184&context=extension_ag_pubs (Year: 2001).*

Gauvrit et al. (Pest Management Science, 2007, 63, 707-713 (Year: 2007).*

Przybylski, R. "Canola Oil: Physical and chemical properties" (https://fr.canolacouncil.org/media/515239/canola_oil_physical_chemical_properties_1.pdf, p. 1-6) (Year: 2014).*

CasChem "Castor Oil and its Chemistry" http://www.chem.uwec.edu/chem491_w01/ Pharmacognosy 491/castor bean chemistry.pdf (Year: 2017).*

Uniqema; "SEE evaluation for Crop applications;" Feb. 2005.

Han Rieffe; "Trimer Acid based Selfemulsifiable esters as delivery system for pesticide formulations;" 2005; www.uniqema.com.

* cited by examiner

*Primary Examiner* — Alton N Pryor

(57) ABSTRACT

Spray drift during the application of agricultural chemicals is reduced by incorporating a self-emulsifiable ester into the liquid to be sprayed.

19 Claims, No Drawings

CONTROLLING SPRAY DRIFT OF PESTICIDES WITH SELF-EMULSIFIABLE ESTERS

This application is a Continuation of U.S. patent application Ser. No. 12/609,404 filed on Oct. 30, 2009 and claims the benefit of U.S. Provisional Application Ser. No. 61/110,060 filed on Oct. 31, 2008.

BACKGROUND OF THE INVENTION

The present invention concerns a novel method to reduce spray drift during the application of agricultural chemicals by incorporating a self-emulsifiable ester into the liquid to be sprayed. Agricultural spraying by economical and available technologies uses hydraulic spray nozzles that inherently produce a wide spectrum of spray droplet sizes. The potential for these spray droplets to drift from the initial, desired site of application is found to be a function of droplet size, with smaller droplets having a higher propensity for off-target movement. Significant research efforts, involving numerous field trials, wind tunnel tests and subsequent generation of predictive math models have led to a greatly enhanced understanding of the relationship between spray droplet size and potential for off-target drift. Although other factors such as meteorological conditions and spray boom height contribute to the potential for drift, spray droplet size distribution has been found to be a predominant factor. Teske et. al. (Teske M. E., Hewitt A. J., Valcore, D. L. 2004. *The Role of Small Droplets in Classifying Drop Size Distributions* ILASS Americas 17th Annual Conference: Arlington Va.) have reported a value of <156 microns (μ) as the fraction of the spray droplet distribution that contributes to drift. Wolf (www.bae.ksu.edu/faculty/wolf/drift.htm) cites a value of <200μ as the driftable fraction. A good estimation of droplet size likely to contribute to drift, therefore, is the fraction below about 175μ.

The negative consequences of off-target movement can be quite pronounced. Some herbicides have demonstrated very sensitive phytotoxicity to particular plant species at extremely low parts per million (ppm) or even parts per billion (ppb) levels, resulting in restricted applications around sensitive crops, orchards and residential plantings. For example, the California Dept of Pesticide Regulation imposes buffers of ½-2 miles (0.8-3.2 kilometers) for propanil containing herbicides applied aerially in the San Joaquin valley.

High molecular weight, water-soluble polymers are currently added to spray compositions as a tank mix to increase droplet size and thereby reduce drift (see, for example, WO 2008/101818 A2 and U.S. Pat. No. 6,214,771 B1). However, high molecular weight, water-soluble polymers are not entirely satisfactory because they are expensive to use at the concentrations required to substantially increase droplet size. Furthermore, research has shown that many commercially available drift retardants typically do not work with many aerially applied herbicide tank mixtures, due to pump shear, wind shear and other performance issues, which are more pronounced in high speed aerial application conditions. See Hewitt, A. J. (2003) Drift Control Adjuvants in Spray Applications: Performance and Regulatory Aspects. *Proc. Third Latin American Symposium on Agricultural Adjuvants*, Sao Paulo, Brazil.

SUMMARY OF THE INVENTION

It has now been found that by incorporating a self-emulsifiable ester into an agricultural spray mixture that spray drift during application can be reduced. The present invention concerns a method to reduce spray drift during the application of a pesticide which comprises incorporating into the pesticidal spray from about 0.01 to about 5 percent vol/vol of a self-emulsifiable ester or mixture thereof. The reduction in spray drift may result from a variety of factors including a reduction in the production of fine spray droplets (<175μ in diameter) and an increase in the volume median diameter (VMD) of the spray droplets. For a given spray apparatus, application, and condition, and based on the self-emulsifiable ester, the median diameter of the plurality of spray droplets is increased above that of a spray composition without said self-emulsifiable ester.

Another embodiment of the invention is a premix formulation which comprises from about 1 to about 90 weight percent of a pesticide, and from about 0.05 to about 30 weight percent of a self-emulsifiable ester. The premix formulation is preferably a solution, emulsion, suspension, wettable or soluble powder, or water-dispersible or water-soluble granule formulation.

DETAILED DESCRIPTION OF THE INVENTION

The method to reduce spray drift applies to the application of any pesticide or crop protection agent including herbicides, fungicides and insecticides. Particularly preferred herbicides to which this method applies include cyhalofop-butyl, haloxyfop, penoxsulam, flumetsulam, cloransulam-methyl, florasulam, pyroxsulam, diclosulam, fluroxypyr, clopyralid, acetochlor, triclopyr, isoxaben, 2,4-D, MCPA, dicamba, MSMA, oxyfluorfen, oryzalin, trifluralin, benfluralin, ethalfluralin, aminopyralid, atrazine, picloram, tebuthiuron, pendimethalin, propanil, propyzamide, glyphosate and glufosinate. Particularly preferred insecticides to which this method applies include organophosphates such as chlorpyrifos, MAC's such as halofenozide, methoxyfenozide and tebufenozide, pyrethroids such as gamma-cyhalothrin and deltamethrin, and biopesticides such as spinosad and spinetoram. Particularly preferred fungicides to which this method applies include mancozeb, myclobutanil, fenbuconazole, zoxamide, propiconazole, quinoxyfen and thifluzamide. The present invention is particularly useful for the application of herbicides, most particularly with herbicides that are subject to restricted applications around sensitive crops which have not been modified to be tolerant of them, such as 2,4-D, dicamba, glyphosate and glufosinate.

Self-emulsifiable esters (SEEs) used in the present invention are characterized as molecules that combine oil (hydrophobic), hydrophilic nonionic, and, optionally, anionic functionality in a single molecule that can form uniform stable emulsions in an aqueous phase. Contrary to conventional emulsions in which one or more oils would be blended with one or more surfactants (emulsifiers), no such additives are necessary for the emulsion disclosed in the present invention. Uniform, stable aqueous emulsions can be formed with these SEEs without the use of additional emulsifiers or oils by little to moderate agitation of the SEE and water mixture. Examples of these SEEs include, but are not limited to, the following: (1) trimer acid based self-emulsifiable esters produced by the polymerization of oleic and linoleic acids having a $C_{54}$ lipophilic backbone and an ester portion of the molecule containing both nonionic and anionic surfactant functionality (see, for example, U.S. Pat. Nos. 5,688,750 and 5,707,945; commercially available under the trademark Priolube products from Croda Uniqema, Inc.); (2) esters prepared by esterification of ethoxylated trimethylolpropane by fatty acids and dicarboxylic acid anhydrides (see, for example, WO1990/005714); (3) esters derived from high molecular weight dibasic acids, polyoxyalkylene glycols and monofunctional aliphatic alcohols (see, for example, U.S. Pat. No. 3,912,642); (4) self emulsifying ester compounds prepared by reacting an ethoxylated trimethylol propane with a carboxylic acid or a reactive derivative thereof, such as an anhydride, as disclosed in U.S. Pat. No. 5,219,479; (5) succinate triglyceride oil derived from maleating triglyceride oil from a plant or land animal (see, for example, WO 2005/071050 A1) commercially available as the trademark VEG-ESTER products of Lubrizol, Inc.; (6) ethoxylated fatty acid esters (see, for example, WO 1996/022109); (7) alkoxylate esters prepared by reacting an alcohol with ethylene oxide and propylene oxide and/or butylene oxide and capping the resulting alkoxylate with an alkanoic or aromatic acid as disclosed in U.S. Pat. No. 4,559,226, available commercially as the trademark Hetester products from the Bernel Chemical Company, Inc., a division of Alzo International, Inc.; and (8) alkoxylated triglycerides commercially available as the trademark Aqnique RSO and Agnique SBO products from Cognis, Inc.

The self-emulsifiable esters can be incorporated into the pesticidal spray by being tank-mixed directly with the diluted pesticidal formulation or by being provided as a pre-mix with the pesticidal formulation prior to dilution to the final spray volume. The self-emulsifiable ester is incorporated at a concentration from about 0.01 to about 5 volume percent of the final spray volume, preferably from about 0.05 to about 1.0 volume percent of the final spray volume, and most preferably from about 0.05 to about 0.2 volume percent of the final spray volume.

The present method reduces off-target movement of the pesticide spray in both aerial and ground applications.

The optimum droplet size depends on the application for which the composition is used. If droplets are too large, there will be less coverage by the spray; i.e, large droplets will land in certain areas while areas in between will receive little or no spray composition. The maximum acceptable droplet size may depend on the amount of composition being applied per unit area and the need for uniformity in spray coverage. Smaller droplets provide more even coverage, but are more prone to drift during spraying. If it is particularly windy during spraying, larger droplets may be preferred, whereas on a calmer day smaller droplets may be preferred.

The spray droplet size may also depend on the spray apparatus; e.g., nozzle size and configuration. One skilled in the art will readily be able to adjust the percentage of surfactant and/or polymer in the composition to provide the desired droplet size for a given apparatus, application, and condition. In any event, for a given spray apparatus, application, and condition, and based on the self-emulsifiable ester, the median diameter of the plurality of spray droplets is increased above that of a spray composition without said self-emulsifiable ester.

In addition to the method set forth above, the present invention also embraces premix formulations comprising from about 1 to about 90 weight percent, preferably from about 5 to about 70 weight percent, and most preferably from about 20 to about 60 weight percent of a pesticide and from about 0.05 to about 30 weight percent, preferably from about 1.0 to about 20 weight percent, and most preferably from about 1.0 to about 10 weight percent of a self-emulsifiable ester.

Optionally, the composition of the present invention may contain a surfactant. The surfactants can be anionic, cationic or nonionic in character. Typical surfactants include salts of alkyl sulfates, such as diethanolammonium lauryl sulfate; alkylarylsulfonate salts, such as calcium dodecylbenzenesulfonate; alkyl and/or arylalkylphenol-alkylene oxide addition products, such as nonylphenol-$C_{18}$ ethoxylate; alcohol-alkylene oxide addition products, such as tridecyl alcohol-$C_{16}$ ethoxylate; soaps, such as sodium stearate; alkylnaphthalenesulfonate salts, such as sodium dibutylnaphthalenesulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; ethoxylated amines, such as tallowamine ethoxylated; betaine surfactants, such as cocoamidopropyl betaine; polyethylene glycol esters of fatty acids, such as polyethylene glycol stearate; block copolymers of ethylene oxide and propylene oxide; salts of mono and dialkyl phosphate esters; and mixtures thereof. The surfactant or mixture of surfactants is usually present at a concentration of from about 1 to about 20 weight percent of the formulation.

In addition to the formulations set forth above, the present invention also embraces formulations in combination with one or more additional compatible ingredients. Other additional ingredients may include, for example, one or more other pesticides, dyes, and any other additional ingredients providing functional utility, such as, for example, stabilizers, fragrances, viscosity-lowering additives, and freeze-point depressants.

The premix formulation is preferably a solution, emulsion, suspension, wettable or soluble powder, or water-dispersible or water-soluble granule formulation.

The following Examples illustrate the invention.

Example 1

To make each concentrated 2,4-D formulations A to G as in Table 1, a stainless steel beaker equipped with a mechanical stirrer was first charged with 90 grams DMA 6 SEQUESTERED, containing 68.8% 2,4-D dimethylammonium salt in an aqueous solution. 10 grams total of the different combinations of the Priolube products were then added according to the compositions in Table 1. Each liquid mixture was stirred to homogenize the composition and to furnish the formulation.

The aqueous spray solution was made by adding 1 mL of the each formulation to 99 mL of deionized water to make a 1% v/v dilution. The spray solution was then sprayed through a TeeJet 8002 flat fan nozzle at 40 psi (276 kilopascal (kPa)) and the droplet size was measured by using a Sympatec Helos particle sizer. The measurements were made with the tip of the nozzle at either 6 or 12 inches (15.24 or 30.48 centimeters (cm)) from the measurement zone of the particle sizer. The results are reported in Table 2 (6 inches; 15.24 cm) and Table 3 (12 inches; 30.48 cm). As can be seen from these results, the driftable fines with droplet size less than 175 μm by the spray composition of the present invention are largely reduced. The present invention efficiently reduces driftable fine droplets by narrowing the drop size distribution profile without significantly increasing the large droplets, thus with minimal effect on spray coverage and quality.

TABLE 1

Compositions for Formulations of Example 1.

| Formulation # | DMA 6 SEQ *, g | Priolube 3955, g | Priolube 3952, g | Priolube 3953, g |
|---|---|---|---|---|
| DMA 6 SEQ * | 100 | 0 | 0 | 0 |
| A | 90 | 0 | 0 | 10 |
| B | 90 | 0 | 5 | 5 |
| C | 90 | 0 | 10 | 0 |
| D | 90 | 3.3 | 3.3 | 3.3 |
| E | 90 | 5 | 0 | 5 |
| F | 90 | 5 | 5 | 0 |
| G | 90 | 10 | 0 | 0 |

* DMA 6 SEQUESTERED, a 6 lb (2.72 kilograms (kg)) ae/gal 2,4-D-dimethylammonium Manufacturing Use Concentrate of Dow AgroSciences, LLC.

TABLE 2

Spray Performance of Example 1 Compositions 6 Inches (15.24 cm) from Nozzle.

| Spray solution | VMD *, µm | Percent <100** µm | Percent <175*** µm |
|---|---|---|---|
| DMA 6 SEQ 1% | 213.00 | 15.99 | 38.72 |
| A 1% | 223.60 | 14.21 | 35.64 |
| B 1% | 287.44 | 4.36 | 16.24 |
| C 1% | 281.19 | 4.65 | 17.55 |
| D 1% | 278.43 | 5.27 | 18.76 |
| E 1% | 267.02 | 6.03 | 21.37 |
| F 1% | 255.07 | 8.52 | 25.99 |
| G 1% | 238.08 | 10.86 | 30.62 |

* VMD—volume median diameter

**Percent of spray volume with droplet size less than 100 µm

***Percent of spray volume with droplet size less than 175 µm

TABLE 3

Spray Performance of Example 1 Compositions 12 Inches (30.48 cm) from Nozzle.

| Spray solution | VMD *, µm | Percent <100** µm | Percent <175*** µm |
|---|---|---|---|
| DMA 6 SEQ 1% | 164 | 20.8 | 53.7 |
| A 1% | 204 | 13.7 | 40.6 |
| B 1% | 251 | 7.2 | 25.9 |
| C 1% | 248 | 7.9 | 27.6 |
| D 1% | 227 | 10.3 | 33.4 |
| E 1% | 237 | 9.0 | 30.5 |
| F 1% | 231 | 9.8 | 32.4 |
| G 1% | 190 | 15.4 | 44.8 |

Example 2

The spray solution of formulations of H to N at 1% v/v was made following the same procedure as in Example 1. To each spray solution was then added the proper amount of glyphosate dimethylammonium salt to achieve an acid equivalent ratio between 2,4-D and glyphosate of 1:1. The dilution was stirred to homogenous to furnish the spray solution. It was then sprayed following the same procedure and settings as described in Example 1. The results are shown in Table 4 (measured 6 inches (15.24 cm) from spray nozzle) and Table 5 (measured 12 inches (30.48 cm) from nozzle). As can be seen from these results, the addition of glyphosate does not significantly affect the spray distribution from previous example, indicating the robustness of the present invention in controlling the driftable fines.

TABLE 4

Spray Performance of Example 2 Compositions 6 Inches (15.24 cm) from Nozzle.

| Spray solution | Spray Composition | VMD, µm | Percent <100 µm | Percent <175 µm |
|---|---|---|---|---|
| DMA 6 SEQ 1% | | 213.00 | 15.99 | 38.72 |
| H | A 1% + glyphosate | 240.35 | 10.02 | 30.09 |
| I | B 1% + glyphosate | 279.53 | 4.58 | 17.28 |
| J | C 1% + glyphosate | 272.80 | 5.06 | 19.02 |
| K | D 1% + glyphosate | 260.34 | 6.09 | 22.43 |
| L | E 1% + glyphosate | 257.79 | 6.54 | 23.32 |
| M | F 1% + glyphosate | 254.81 | 7.06 | 24.41 |
| N | G 1% + glyphosate | 235.76 | 10.24 | 30.60 |

TABLE 5

Spray Performance of Example 2 Compositions 12 Inches (30.48 cm) from Nozzle.

| Spray solution | Spray Composition | VMD, µm | Percent <100 µm | Percent <175 µm |
|---|---|---|---|---|
| DMA 6 SEQ 1% + glyphosate 1% | | 148 | 25.2 | 60.2 |
| H | A 1% + glyphosate | 180 | 18.0 | 48.2 |
| I | B 1% + glyphosate | 250 | 7.4 | 26.5 |
| J | C 1% + glyphosate | 235 | 9.2 | 30.8 |
| K | D 1% + glyphosate | 230 | 10.0 | 32.7 |
| L | E 1% + glyphosate | 224 | 10.6 | 34.3 |
| M | F 1% + glyphosate | 230 | 9.7 | 32.4 |
| N | G 1% + glyphosate | 207 | 12.9 | 39.6 |

Example 3

To make each of the concentrated herbicide formulations O to Q shown in Table 4, a stainless steel beaker equipped with a mechanical stirrer was first charged with 95 g of the herbicide formulation (either DMA6 SEQ, Garlon 3A*, or Milestone**) and 5 g of Hetester PCA (obtained from Alzo International Inc.). Each liquid mixture was stirred to homogenize the composition and to furnish the formulation for subsequent dilution and spray analysis.

The aqueous spray solutions of each were made by adding 2 ml of each of the formulations to 98 ml of deionized water to make 2% v/v dilutions. The solutions were then sprayed following the same procedure and settings as described in Example 1, with the spray nozzle 12 inches (30.48 cm) from particle sizer measurement zone. The results are shown in Table 6. As can be seen from these results, the present invention does effectively reduce the driftable fine droplets by narrowing the drop size distribution profile without significantly increasing the large droplets, thus having minimal effect on spray coverage and quality.

*Garlon 3A, a 3 lb (1.36 kg) ae/gal triclopyr triethylamine salt commercial product of Dow AgroSciences, LLC.

**Milestone, a 2 lb (0.91 kg) ae/gal aminopyralid triisopropanolamine salt commercial product of Dow AgroSciences, LLC.

TABLE 6

Spray Performance of Example 3 Compositions.

| Spray Solution | Spray Composition | VMD, µm | Percent <100 µm | Percent <175 µm |
|---|---|---|---|---|
| DMA6 SEQ 2% | | 163.15 | 21.8 | 54.2 |
| Garlon 3A 2% | | 181.20 | 17.9 | 47.8 |
| Milestone 2% | | 152.11 | 24.9 | 58.5 |
| O 2% | DMA6 SEQ + Hetester PCA | 165.72 | 21.2 | 53.2 |
| P 2% | Garlon 3A + Hetester PCA | 255.11 | 8.8 | 25.5 |
| Q 2% | Milestone + Hetester PCA | 243.62 | 8.6 | 26.7 |

Example 4

To make each of the herbicide formulations R through T shown in Table 7, a sample jar was first charged with 294 mL of deionized water, followed by 6 mL of the commercial herbicide formulation (either DMA6 SEQ, Clarity*, or Accord XRT II**) to make a 2% v/v dilution of the formulation. The sample was then shaken until homogeneous. To each of these solutions Veg-Ester GY-350 (Lubrizol, Inc.) was then added in an amount equal to 0.1% w/w of the diluted herbicide formulation. The sample was once again shaken until homogeneous. The solutions were then sprayed following the same procedure and settings as described in Example 1, with the spray nozzle 12 inches (30.48 cm) from particle sizer measurement zone. The results are shown in Table 5. As can be seen from these results, the present invention does effectively reduce the driftable fine droplets by altering the drop size distribution profile without significantly increasing the large droplets, thus having minimal effect on spray coverage and quality.

*Clarity, a 4 lb (1.81 kg) ae/gal dicamba diglycolamine salt commercial product of BASF corp.

**Accord XRT II, a 4 lb (1.81 kg) ae/gal glyphosate dimethylamine salt commercial product of Dow AgroSciences, LLC.

TABLE 7

Spray Performance of Example 4 Compositions.

| Spray Solution | Spray Composition | VMD, µm | Percent <100 µm | Percent <175 µm |
|---|---|---|---|---|
| Clarity 2% | | 159.21 | 22.55 | 55.8 |
| Accord XRT II 2% | | 142.49 | 27.73 | 63.1 |
| DMA6 SEQ 2% | | 163.15 | 21.79 | 54.2 |
| R 2% | Clarity 2% + GY-350 0.1% | 192.48 | 16.39 | 44.2 |
| S 2% | Accord XRT II 2% + GY-350 0.1% | 160.58 | 21.52 | 55.4 |
| T 2% | DMA6 SEQ 2% + GY-350 0.1% | 175.55 | 20.21 | 49.7 |

Example 5

1.40 ml of an aqueous solution of Dicamba dimethylammonium salt (Dicamba DMA, 46.9% w/w a.e., 560.92 g a.e./L) and 0.649 g of Priolube 3952 were added to 324 ml of deionized water and hand shaken to yield a solution containing 0.43% v/v of Dicamba DMA and 0.2% w/w of Priolube 3952. In a similar manner, 1.45 ml of the Dicamba dimethylammonium salt solution and 0.70 g of Agnique SBO-10 were added to 335 ml of deionized water to yield a solution containing 0.43% v/v of Dicamba DMA and 0.2% w/w of Agnique SBO-10. As a control, 1.45 ml of the Dicamba DMA concentrate was added to 336 ml of deionized water to yield a 0.43% v/v solution. Finally, a 0.43% v/v solution of Clarity was prepared for comparison. The resulting solutions were sprayed and their droplet size distributions measured as described in Example 1, with the spray nozzle 12 inches (30.48 cm) from particle sizer measurement zone. The results are summarized in Table 8. As can be seen from these results, the present invention does effectively reduce the driftable fine droplets by altering the drop size distribution profile without significantly increasing the large droplets, thus having minimal effect on spray coverage and quality.

TABLE 8

Spray Performance of Example 5 Compositions.

| Spray Solution | VMD, µm | Percent <100 µm | Percent <175 µm |
|---|---|---|---|
| 0.43% Dicamba DMA | 159 | 22.4 | 55.4 |
| 0.43% Dicamba DMA + 0.2% Priolube 3952 | 260 | 6.2 | 23.1 |
| 0.43% Dicamba DMA + 0.2% Agnique SBO-10 | 280 | 4.9 | 17.7 |
| 0.43% Clarity | 161 | 21.5 | 55.1 |

Example 6

To 359.07 g of deionized water was added in order: 2.75 g of 2,4-D dimethylethanolammonium salt solution (53.6% a.e.), 0.15 g of Agnique SBO-10, 0.38 g of propylene glycol, and 3.52 g glyphosate dimethylammonium salt solution (42.2% a.e.). As a control, a second sample was prepared as just described, except the Agnique SBO-10 was replaced with 0.15 g of additional deionized water. The resulting solutions were briefly hand-shaken and then analyzed for their spray droplet distributions as described in Example 1, with the spray nozzle 12 inches (30.48 cm) from particle sizer measurement zone. The results are shown in Table 9.

TABLE 9

Spray Performance of Example 6 Compositions.

| Spray Solution | VMD, µm | Percent <100 µm | Percent <175 µm |
|---|---|---|---|
| 0.40% 2,4-D a.e., 0.41% Glyphosate a.e. | 159 | 22.4 | 56.1% |
| 0.40% 2,4-D a.e., 0.41% Glyphosate a.e. 0.04% + SBO-10 | 269 | 6.2 | 22.2% |

We claim:

1. A method to reduce spray drift during the application of a pesticide from a spray apparatus which comprises:

a. incorporating into a pesticidal spray formulation from about 0.05 to about 0.2 percent vol/vol of a self-emulsifiable ester selected from the group consisting of: (1) trimer acid based self-emulsifiable esters produced by the polymerization of oleic and linoleic acids having a $C_{54}$ lipophilic backbone and an ester portion of the molecule containing both nonionic and anionic surfactant functionality; (2) esters prepared by esterification of ethoxylated trimethylolpropane by fatty acids and dicarboxylic acid anhydrides; (3) esters derived from high molecular weight dibasic acids, polyoxyalkylene glycols and monofunctional aliphatic alcohols; (4) self-emulsifying ester compounds prepared by reacting an ethoxylated trimethylol propane with a carboxylic acid or a reactive derivative thereof; and mixtures thereof, and b. spraying a volume of the pesticidal spray formulation from the spray apparatus comprising a nozzle to produce spray droplets, wherein 34.3% or less of the pesticidal spray formulation volume forms spray droplets smaller than 175 μm in diameter when measured at 30.48 cm from the tip of the nozzle; and wherein the volume median diameter of the spray droplets formed from the pesticidal spray formulation is increased above the volume median diameter of the same pesticidal spray formulation without the self-emulsifiable ester, when sprayed from the same spray apparatus and nozzle and wherein the pesticidal formulation comprises a pesticide.

2. The method of claim 1 in which the pesticide is an herbicide.

3. The method of claim 2 in which the herbicide is 2,4-D, glyphosate, triclopyr, aminopyralid, dicamba or mixtures thereof.

4. The method of claim 1 in which the pesticide is an insecticide.

5. The method of claim 1 in which the pesticide is a fungicide.

6. The method of claim 1, wherein the volume median diameter of the spray droplets is between about 224 μm and about 280 μm.

7. The method of claim 1, wherein the self-emulsifiable ester is the trimer acid based self-emulsifiable esters produced by the polymerization of oleic and linoleic acids having a $C_{54}$ lipophilic backbone and an ester portion of the molecule containing both nonionic and anionic surfactant functionality.

8. The method of claim 1, wherein the self-emulsifiable ester is the esters prepared by esterification of ethoxylated trimethylolpropane by fatty acids and dicarboxylic acid anhydrides.

9. The method of claim 1, wherein the self-emulsifiable ester is the esters derived from high molecular weight dibasic acids, polyoxyalkylene glycols and monofunctional aliphatic alcohols.

10. The method of claim 1, wherein the self-emulsifiable ester is the self-emulsifying ester compounds prepared by reacting an ethoxylated trimethylol propane with a carboxylic acid or a reactive derivative thereof.

11. A premix formulation in a spray apparatus which comprises from about 5 to about 70 weight percent of a pesticide and from about 1.0 to about 10 weight percent of a self-emulsifiable ester selected from the group consisting of: (1) trimer acid based self-emulsifiable esters produced by the polymerization of oleic and linoleic acids having a $C_{54}$ lipophilic backbone and an ester portion of the molecule containing both nonionic and anionic surfactant functionality; (2) esters prepared by esterification of ethoxylated trimethylolpropane by fatty acids and dicarboxylic acid anhydrides; (3) esters derived from high molecular weight dibasic acids, polyoxyalkylene glycols and monofunctional aliphatic alcohols; (4) self-emulsifying ester compounds prepared by reacting an ethoxylated trimethylol propane with a carboxylic acid or a reactive derivative thereof; and mixtures thereof;

wherein the premix formulation, when diluted to form a pesticidal spray formulation at 1% v/v dilution and when a volume of the pesticidal spray formulation is sprayed from the spray apparatus comprising a nozzle, produces spray droplets smaller than 175 μm in diameter that are 34.3% or less of the pesticidal spray formulation volume when measured at 30.48 cm from the tip of the nozzle; and wherein the volume median diameter of the spray droplets formed from the pesticidal spray formulation is increased above the volume median diameter of a similar pesticidal spray composition without the self-emulsifiable ester, when sprayed from the same spray apparatus and nozzle.

12. The premix formulation of claim 11 which comprises from about 20 to about 60 weight percent of the pesticide and from about 1.0 to about 10 weight percent of the self-emulsifiable ester.

13. The premix formulation of claim 11, wherein the premix formulation is selected from the group consisting of a solution, an emulsion, a suspension, a wettable powder, a soluble powder, a water-dispersible granule formulation, and a water-soluble granule formulation.

14. The premix formulation of claim 13, wherein the premix formulation is aqueous.

15. The premix formulation of claim 11, wherein the self-emulsifiable ester is the trimer acid based self-emulsifiable esters produced by the polymerization of oleic and linoleic acids having a $C_{54}$ lipophilic backbone and an ester portion of the molecule containing both nonionic and anionic surfactant functionality.

16. The premix formulation of claim 11, wherein the self-emulsifiable ester is the esters prepared by esterification of ethoxylated trimethylolpropane by fatty acids and dicarboxylic acid anhydrides.

17. The premix formulation of claim 11, wherein the self-emulsifiable ester is the esters derived from high molecular weight dibasic acids, polyoxyalkylene glycols and monofunctional aliphatic alcohols.

18. The premix formulation of claim 11, wherein the self-emulsifiable ester is the self-emulsifying ester compounds prepared by reacting an ethoxylated trimethylol propane with a carboxylic acid or a reactive derivative thereof.

19. A method to reduce spray drift during the application of a fungicide from a spray apparatus which comprises:

a. incorporating into a fungicidal spray formulation from about 0.05 to about 0.2 percent vol/vol of a self-emulsifiable ester selected from the group consisting of: (1) trimer acid based self-emulsifiable esters produced by the polymerization of oleic and linoleic acids having a $C_{54}$ lipophilic backbone and an ester portion of the molecule containing both nonionic and anionic surfactant functionality; (2) esters prepared by esterification of ethoxylated trimethylolpropane by fatty acids and dicarboxylic acid anhydrides; (3) esters derived from high molecular weight dibasic acids, polyoxyalkylene glycols and monofunctional aliphatic alcohols; (4) self-emulsifying ester compounds prepared by reacting an ethoxylated trimethylol propane with a carboxylic acid or a reactive derivative thereof; and mixtures thereof, and b. spraying a volume of the pesticidal spray formulation from the spray apparatus comprising a nozzle to produce spray droplets, wherein 34.3% or less of the fungicidal spray formulation volume forms spray droplets smaller than 175 μm in diameter when measured at 30.48 cm from the tip of the nozzle; and wherein the volume median diameter of the spray droplets formed from the fungicidal spray formulation is increased above the volume median diameter of the same fungicidal spray formulation without the self-emulsifiable ester, when sprayed from the same spray apparatus and nozzle; and wherein the fungicide is mancozeb, myclobutanil, fenbuconazole, zoxamide, propiconazole, quinoxyfen, thifluzamide or mixtures thereof.

* * * * *